United States Patent
Prins et al.

(10) Patent No.: US 9,696,076 B2
(45) Date of Patent: Jul. 4, 2017

(54) METHOD OF CONTROLLING ONE OR MORE FANS OF A HEAT REJECTING HEAT EXCHANGER

(71) Applicant: Danfoss A/S, Nordborg (DK)

(72) Inventors: Jan Prins, Havnbjerg (DK); Frede Schmidt, Soenderborg (DK)

(73) Assignee: Danfoss A/S, Nordborg (DE)

( * ) Notice: Subject to any disclaimer, the term of this patent is extended or adjusted under 35 U.S.C. 154(b) by 275 days.

(21) Appl. No.: 14/390,865

(22) PCT Filed: Apr. 19, 2013

(86) PCT No.: PCT/EP2013/001167
§ 371 (c)(1),
(2) Date: Oct. 6, 2014

(87) PCT Pub. No.: WO2013/156158
PCT Pub. Date: Oct. 24, 2013

(65) Prior Publication Data
US 2015/0059369 A1    Mar. 5, 2015

(30) Foreign Application Priority Data
Apr. 20, 2012  (EP) .................. 12002802

(51) Int. Cl.
*F25B 49/02*  (2006.01)
*F25D 17/06*  (2006.01)

(52) U.S. Cl.
CPC ............ *F25B 49/02* (2013.01); *F25B 49/027* (2013.01); *F25D 17/06* (2013.01);
(Continued)

(58) Field of Classification Search
CPC ............ F25B 49/027; F25B 2313/0294; F25B 2600/19; F25B 2600/111;
(Continued)

(56) References Cited

U.S. PATENT DOCUMENTS

| 5,086,626 A | 2/1992 | Iida |
| 2003/0182957 A1* | 10/2003 | Hu ................... F25D 17/065 62/228.4 |
| 2007/0125106 A1 | 6/2007 | Ishikawa et al. |

FOREIGN PATENT DOCUMENTS

| CN | 1777781 A | 5/2006 |
| CN | 101292121 A | 10/2008 |
| EP | 2 434 234 A2 | 3/2013 |

OTHER PUBLICATIONS

European Search Report Serial No. EP12002802 dated Oct. 8, 2012.
International Search Report for PCT Serial No. PCT/EP2013/001167 dated Aug. 6, 2013.

* cited by examiner

*Primary Examiner* — Jonathan Bradford
(74) *Attorney, Agent, or Firm* — McCormick, Paulding & Huber LLP

(57) ABSTRACT

A method of controlling a fan of a vapor compression system is disclosed. The vapor compression system includes a compressor, a heat rejecting heat exchanger, e.g. in the form of a gas cooler or a condenser, an expansion device and an evaporator arranged in a refrigerant circuit. The fan is arranged to provide a secondary fluid flow across the heat rejecting heat exchanger, e.g. in the form of an air flow. The method allows the electrical energy consumption of the fan to be reduced without risking instability of the vapor compression system.

20 Claims, 4 Drawing Sheets

(52) U.S. Cl.
CPC ... *F25B 2313/0294* (2013.01); *F25B 2600/11* (2013.01); *F25B 2600/111* (2013.01); *F25B 2700/172* (2013.01); *F25B 2700/2103* (2013.01); *F25B 2700/2106* (2013.01); *F25B 2700/21163* (2013.01); *Y02B 30/743* (2013.01)

(58) Field of Classification Search
CPC ...... F25B 2700/2102; F25B 2700/2103; F25B 2700/2116; F25B 2700/21163; F24F 11/0076; F25D 17/06; B60H 2001/3277
See application file for complete search history.

METHOD OF CONTROLLING ONE OR MORE FANS OF A HEAT REJECTING HEAT EXCHANGER

CROSS-REFERENCE TO RELATED APPLICATION

This application is entitled to the benefit of and incorporates by reference subject matter disclosed in International Patent Application No. PCT/EP2013/001167 filed on Apr. 19, 2013 and European Patent Application 12002802.2 filed Apr. 20, 2012.

FIELD OF THE INVENTION

The present invention relates to a fan of a vapour compression system comprising a compressor, a heat rejecting heat exchanger, an expansion device and an evaporator arranged in a refrigerant circuit. The fan being controlled by means of the method of the invention is arranged to provide a secondary fluid flow across the heat rejecting heat exchanger. The method of the invention allows the electrical energy consumption of the fan to be reduced as compared to prior art control methods.

BACKGROUND

Vapour compression systems, such as refrigeration systems, air condition systems or heat pumps, normally comprise a heat rejecting heat exchanger arranged to exchange heat with a secondary fluid flow across the heat rejecting heat exchanger in such a manner that heat is rejected from the vapour compression system and transferred to the secondary fluid flow. The heat rejecting heat exchanger may, e.g., be in the form of a condenser or in the form of a gas cooler.

Previously, an outlet temperature of refrigerant leaving the heat rejecting heat exchanger was expected to decrease slowly as a function of an increase in fan speed of the one or more fans arranged to cause the secondary fluid flow across the heat rejecting heat exchanger. Some vapour compression systems have been provided with heat recovery systems arranged to recover heat from the refrigerant immediately before the refrigerant reaches the heat rejecting heat exchanger, and use the recovered heat in other parts of the vapour compression system or in systems for external to the vapour compression system.

The heat recovery has the consequence that the refrigerant which reaches the heat rejecting heat exchanger has already been cooled, and thereby the heat needing to be rejected from the vapour compression system by the heat rejecting heat exchanger is considerably reduced. As a consequence, the heat rejecting heat exchanger may be over-dimensioned. The outlet temperature of refrigerant leaving the heat rejecting heat exchanger decreases drastically as the speed of the fan increases. This makes it difficult to control the fan or fans, because small variations in fan speed cause significant variations in the outlet temperature of refrigerant leaving the heat rejecting heat exchanger, thereby causing instability. Furthermore, at low fan speed, the response in outlet temperature to changes in the fan speed is very strong, while at high fan speed, the response in outlet temperature to changes in the fan speed is very weak. The optimal operating point for the fan speed is exactly at the point where the response in outlet temperature changes from strong to weak. This makes it even more difficult to control the fan speed dynamically. This problem has previously been solved by simply allowing the fan or fans to operate continuously at a high rotational speed, e.g. at or close to maximum rotational speed. However, this causes a relatively high electrical energy consumption of the fan or fans.

U.S. Pat. No. 5,086,626 discloses an air conditioner with function for temperature control of radiant heat exchanger. A fan delivers air to an indoor heat exchanger. A temperature sensor detects the temperature of the radiant heat exchanger. A controller controls the indoor heat exchanger fan speed for controlling the radiant heat temperature from the radiant heat exchanger in accordance with a temperature detection signal from the sensor. In U.S. Pat. No. 5,086,626 the fan speed is controlled on the basis of a measured surface temperature of the radiant heat exchanger, and not on the basis of a temperature of refrigerant leaving the radiant heat exchanger.

SUMMARY

It is an object of embodiments of the invention to provide a method for controlling a fan of a vapour compression system in which electrical energy consumption of the fan is decreased.

It is a further object of embodiments of the invention to provide a method for controlling a fan of a vapour compression system in which stability of operation of the vapour compression system is obtained without increasing the electrical energy consumption of the fan.

According to a first aspect the invention provides a method of controlling a fan of a vapour compression system, the vapour compression system comprising a compressor, a heat rejecting heat exchanger, an expansion device and an evaporator arranged in a refrigerant circuit, said fan being arranged to provide a secondary fluid flow across the heat rejecting heat exchanger, the method comprising the steps of:

- establishing a temperature, $T_1$, of refrigerant leaving the heat rejecting heat exchanger,
- establishing a temperature, $T_2$, of ambient air of the heat rejecting heat exchanger,
- deriving a temperature difference, $\Delta T=T_1-T_2$, between the temperature ($T_1$) of refrigerant leaving the heat rejecting heat exchanger and the temperature ($T_2$) of ambient air of the heat rejecting heat exchanger,
- comparing the temperature difference, $\Delta T$, to a first threshold value and to a second threshold value, the second threshold value being smaller than or equal to the first threshold value, and
- controlling the rotational speed of the fan on the basis of the comparing step.

Vapour compression system' should be interpreted to mean any system in which a flow of fluid, such as refrigerant, circulates and is alternatingly compressed and expanded, thereby providing either refrigeration or heating of a volume. Thus, the vapour compression system may be a refrigeration system, an air condition system, a heat pump, etc. The vapour compression system, thus, comprises a compressor, a heat rejecting heat exchanger, at least one expansion device, e.g. in the form of expansion valve(s), and at least one evaporator, arranged along a refrigerant circuit.

The vapour compression system further comprises a fan arranged to provide a secondary fluid flow across the heat rejecting heat exchanger. The secondary fluid flow may be a flow of air, or a flow of another gas than air, driven by the fan. Thus, the heat rejecting heat exchanger provides heat exchange between refrigerant flowing through the heat rejecting heat exchanger, via the refrigerant circuit, and fluid of the secondary fluid flow. The heat exchange takes place in such a manner that heat is rejected from the refrigerant and transferred to the fluid of the secondary fluid flow.

It should be noted that the vapour compression system may comprise two or more fans arranged to provide the secondary fluid flow across the heat rejecting heat exchanger. Therefore, in the following the term 'fan' should be interpreted to cover a single fan providing the secondary fluid flow, one of two or more fans providing the secondary fluid flow, or two or more fans providing the secondary fluid flow.

According to the method of the first aspect of the invention, a first temperature, $T_1$, is initially established, $T_1$ being a temperature of refrigerant leaving the heat rejecting heat exchanger. $T_1$ may be measured directly, e.g. by means of a temperature sensor which may be arranged in the refrigerant circuit at the outlet of the heat rejecting heat exchanger. As an alternative, $T_1$ may be established in a more indirect manner, e.g. by measuring another value which is indicative of the temperature of refrigerant leaving the heat rejecting heat exchanger, and subsequently calculating the temperature on the basis of the measured value.

Subsequently or simultaneously, a second temperature, $T_2$, is established, $T_2$ being a temperature of ambient air of the heat rejecting heat exchanger. $T_2$ may be measured directly, e.g. by means of a temperature sensor arranged near the heat rejecting heat exchanger, possibly in the secondary fluid flow. As an alternative, $T_2$ may be established in a more indirect manner, e.g. by measuring another value which is indicative of the temperature of ambient air of the heat rejecting heat exchanger, and subsequently calculating the temperature on the basis of the measured value.

Subsequently, a temperature difference, $\Delta T = T_1 - T_2$, is derived, $\Delta T$ being the difference between the temperature ($T_1$) of refrigerant leaving the heat rejecting heat exchanger and the temperature ($T_2$) of ambient air of the heat rejecting heat exchanger. Accordingly, $\Delta T$ indicates how close the temperature of refrigerant leaving the heat rejecting heat exchanger is to the ambient temperature, since $\Delta T$ approaches zero when $T_1$ approaches $T_2$. The temperature difference is a measure for how much heat it is required to reject by means of the heat rejecting heat exchanger in order to ensure that the vapour compression system is operated in an efficient manner. If the temperature difference is small, sufficient heat is being rejected by the heat rejecting heat exchanger, and the fan speed may be reduced. if the temperature difference is large, there is a need for more heat to be rejected by the heat rejecting heat exchanger, and it may be necessary to increase the fan speed for obtaining more heat being rejected by the heat rejecting heat exchanger.

It should be noted that the method of the present invention should also be interpreted to cover situations where the temperature difference is measured directly, e.g. by means of a thermocouple, instead of measuring the first and second temperatures separately and calculating the temperature difference.

Subsequently, the temperature difference, $\Delta T$, is compared to a first threshold value and a second threshold value, the second threshold value being smaller than or equal to the first threshold value.

Finally, the rotational speed of the fan is controlled on the basis of the comparing step. Thus, the rotational speed of the fan is controlled on the basis of how close the temperature of refrigerant leaving the heat rejecting heat exchanger is to the temperature of the ambient air. By comparing the temperature difference, $\Delta T$, to the first threshold value and the second threshold value, the rotational speed of the fan can be controlled in such a manner that the temperature difference is maintained within a desired range. The temperature difference can be regarded as a measure for how much heat is required to be rejected by the heat rejecting heat exchanger, and accordingly, the rotational speed of the fan is thereby controlled in such a manner that the speed required ensures sufficient heat is rejected for obtaining efficient operation of the vapour compression system, but without applying an excessive speed. Thereby the electrical energy consumption of the fan is reduced without risking instability.

The step of controlling the rotational speed of the fan may comprise the steps of:
  if the temperature difference, $\Delta T$, is larger than the first threshold value, increasing the rotational speed of the fan, and
  if the temperature difference, $\Delta T$, is smaller than the second threshold value, decreasing the rotational speed of the fan.

According to this embodiment, the rotational speed of the fan is increased if the temperature difference is large, and the rotational speed of the fan is decreased if the temperature difference is small. As described above, a large temperature difference indicates that more heat needs to be rejected by the heat rejecting heat exchanger, which is obtained by increasing the rotational speed of the fan. A small temperature difference indicates that sufficient heat is being rejected by the heat rejecting heat exchanger, which allows reducing the rotational speed of the fan, thereby reducing the electrical energy consumption of the fan, without risking instability. Furthermore, the rotational speed of the fan is controlled in such a manner that the temperature difference is maintained within a desired range.

The step of decreasing the rotational speed of the fan may be performed by ramping down the rotational speed. According to this embodiment, the rotational speed of the fan is decreased slowly and gradually, e.g. continuously or in small steps, when the temperature difference is smaller than the second threshold value. Thereby it is prevented that the rotational speed of the fan is decreased so much that the temperature difference jumps to a value above the first threshold value.

The step of decreasing the rotational speed of the fan may include decreasing the speed by 0.1%-10.0% of the maximum rotational speed of the fan per minute, such as 0.1%-9.0%, such as 0.5%-8.0%, such as 1.0%-7.0%, such as 2.0%-6.0%, such as 3.0%-5.5%, such as 4.0%-5.0%, such as approximately 5.0%. According to this embodiment, the rotational speed of the fan is decreased in fixed steps, and the size of the fixed step is defined as a specified percentage of the maximum rotational speed which the fan is capable of operating at. For instance, if the maximum rotational speed of the fan is 300 rpm, and the rotational speed is decreased by 1% of the maximum rotational speed per minute, then the rotational speed of the fan is decreased by 3 rpm per minute.

Alternatively or additionally, the step of increasing the rotational speed of the fan may be performed by jumping up the rotational speed. According to this embodiment, the rotational speed of the fan is increased abruptly and in a large step when the temperature difference is larger than the first threshold value. Thereby it is ensured that when the temperature difference is too high, indicating that more heat needs to be rejected by the heat rejecting heat exchanger, the rotational speed is increased quickly and significantly, in order to quickly move the temperature difference into the desired range.

The step of increasing the rotational speed of the fan may include increasing the rotational speed of the fan by 5%-100% of the maximum rotational speed of the fan, such as 7%-90%, such as 10%-80%, such as 15%-75%, such as 20%-70%, such as 30%-65%, such as 40%-60%, such as 45%-55%, such as approximately 50%.

Preferably, when a jump in rotational speed has been performed, a specified time period is allowed to elapse before it is determined whether or not an additional jump in rotational speed is required. The vapour compression system is allowed to react to the first jump before performing another jump.

According to one embodiment, the rotational speed of the fan is ramped down when the temperature difference is smaller than the second threshold value, and the rotational speed is jumped up when the temperature difference is larger than the first threshold value. Asymmetry in the control of the rotational speed of the fan is particularly advantageous for the following reasons. When the temperature difference is high, indicating that the electrical energy consumption of the system is too high, and there is a risk of instability. Accordingly, it is desirable to move away from this situation as quickly as possible. When the temperature difference is low, indicating that the fan is probably operating at a rotational speed which is too high, thereby consuming too much electrical energy, it is desirable to reduce the rotational speed. However, the total electrical energy consumption of the vapour compression system when the temperature difference is too high is much higher than the total electrical energy consumption when the temperature difference is too low. Therefore it is desirable to increase the fan speed quickly when the temperature difference is high, even if this temporarily results in a rotational speed which is too high. However, when the temperature difference is too low, it is more important to avoid that the temperature difference increases to above the first threshold value than to decrease the rotational speed of the fan quickly. Therefore it is desirable to reduce the rotational speed slowly and in a controlled manner in this situation. Thus, according to this embodiment an optimal energy consumption is ensured without risking instability.

As an alternative, the step of increasing the rotational speed of the fan may be performed by ramping up the rotational speed. According to this embodiment, the rotational speed is increased and decreased in essentially the same manner. The step of increasing the rotational speed of the fan includes increasing the speed by 1%-50% of the maximum rotational speed of the fan per minute, such as 0.15%-9.045%, such as 0.57%-8.030%, such as 1.010%-7.025%, such as 2.010%-6.200%, such as 3.015%-5.25%, such as 4.020%-5.30%, such as approximately 5.025%.

The step of increasing the rotational speed of the fan and/or the step of decreasing the rotational speed of the fan may be performed using an asymmetric function, e.g. a scaling function, e.g. an aggressive scaling function, such as an exponential function. According to this embodiment it can also be ensured that temperature difference can be decreased quickly if it is established that the temperature difference is above the first threshold value.

The second threshold value may be smaller than the first threshold value, and the method may further comprise the step of:

if the temperature difference, $\Delta T$, is smaller than the first threshold value and larger than the second threshold value, maintaining the rotational speed of the fan.

According to this embodiment, the rotational speed of the fan is controlled in such a manner that the temperature difference is maintained within the range defined by the first threshold value and the second threshold value.

As an alternative, the first threshold value is equal to the second threshold value. According to this embodiment, the rotational speed of the fan is controlled in order to obtain a specific temperature difference, i.e. a set point value of the temperature difference.

The vapour compression system may be operated with a refrigerant being in a supercritical state when flowing in the refrigerant circuit. According to this embodiment, the heat rejecting heat exchanger is a gas cooler.

The refrigerant flowing in the refrigerant circuit may be carbon-dioxide ($CO_2$). $CO_2$ is often in a supercritical state when used as a refrigerant, and the heat rejecting heat exchanger is a gas cooler.

According to a second aspect the invention provides a heat rejecting heat exchanger comprising a fan being arranged to provide a secondary fluid flow across the heat rejecting heat exchanger, said fan being capable of being controlled by a method according to the first aspect of the invention.

The invention further provides a refrigeration system comprising a compressor, a gas cooler, an expansion device and an evaporator arranged in a refrigerant circuit, said gas cooler being a heat rejecting heat exchanger according to the second aspect of the invention.

BRIEF DESCRIPTION OF THE DRAWINGS

The invention will now be described in further detail with reference to the accompanying drawings in which.

DETAILED DESCRIPTION

Figure 1:
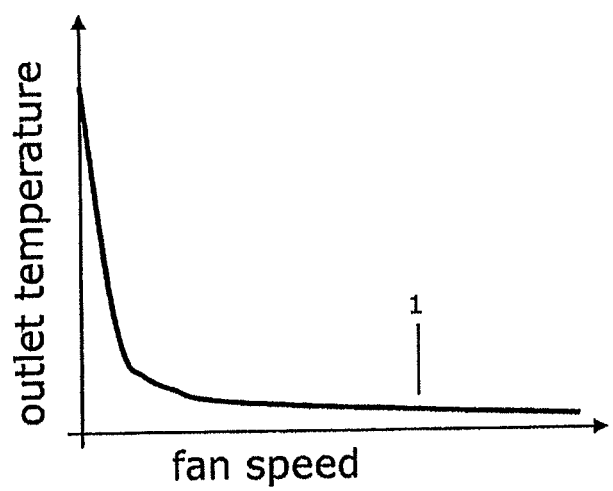
FIGS. 1-3 are graphs illustrating temperature of refrigerant leaving the heat rejecting heat exchanger, as a function of rotational speed of a fan.

FIG. 1 is a graph illustrating temperature (outlet temperature) of refrigerant leaving a heat rejecting heat exchanger of a vapour compression system, said temperature being illustrated as a function of rotational speed of a fan arranged to provide a secondary fluid flow across the heat rejecting heat exchanger. FIG. 1 illustrates that at low fan speeds, the outlet temperature is relatively high, but the outlet temperature decreases rapidly when the fan speed is increased, the temperature thereby approaching the temperature of ambient air of the heat rejecting heat exchanger.

It is a disadvantage if the outlet temperature is very high, i.e. much higher than the temperature of the ambient air, because the heat rejecting heat exchanger is not operating efficiently, and thereby the total energy consumption of vapour compression system is increased, and there is a risk of instability. Therefore, in prior art methods for controlling the rotational speed of the fan, the fan has been operated continuously at a relatively high rotational speed, at or near region 1, in order to avoid the outlet temperature increasing due to a too low fan speed. However, this causes a relatively high electrical energy consumption of the fan.

Figure 2:
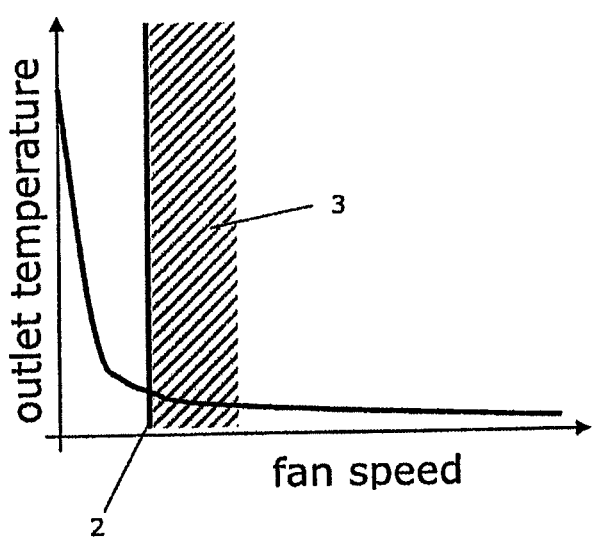

FIG. 2 shows the graph of FIG. 1. However, in FIG. 2, an optimal operating point 2 for the fan speed is indicated. The optimal operating point 2 is the fan speed where the electrical energy consumption of the fan is minimised without risking an unacceptably high outlet temperature. Thus, at fan speeds below the optimal point 2, the outlet temperature becomes too high, and at fan speeds above the optimal point 2, the electrical energy consumption of the fan increases.

An effective range 3 of fan speeds is also shown in FIG. 2. The effective range 3 is a range of fan speeds above the optimal point 2, where the electrical energy consumption of the fan is acceptable. Accordingly, it is desirable to operate the rotational speed of the fan in such a manner that the rotational speed of the fan is within the effective range 3. Under no circumstances should the rotational speed of the fan be allowed to fall below the optimal point 2, but it is acceptable to operate the rotational speed of the fan in the effective range 3 immediately above the optimal point 2. Accordingly, if the rotational speed of the fan decreases to falls below the optimal point 2, the rotational speed of the fan should be increased rapidly and significantly for ensuring that the rotational speed is immediately increased to a level above the optimal point 2. However, if the rotational speed of the fan increases to above the effective range 3, the rotational speed of the fan should be decreased slowly and gradually for ensuring that the rotational speed is not decreased to a value below the optimal point 2. Thus, FIG. 2 illustrates the asymmetry in control of the fan, said asymmetry having been described previously.

Figure 3:
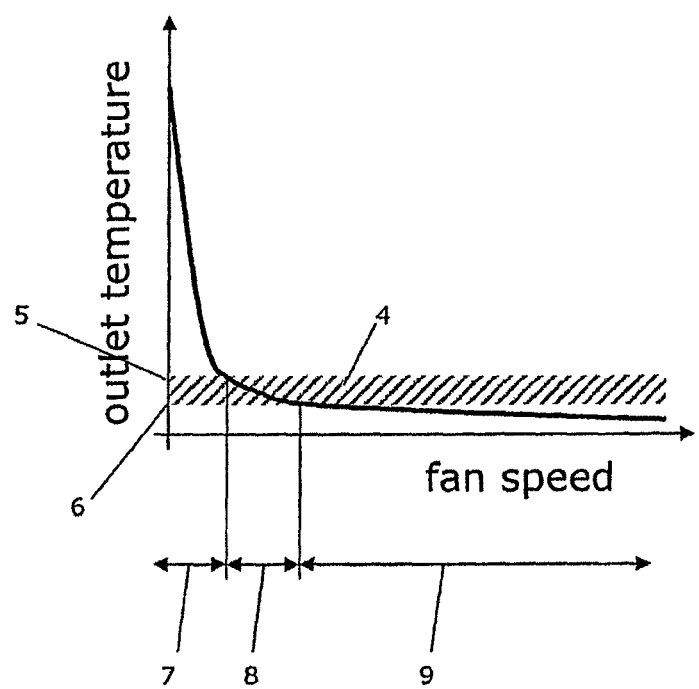

FIG. 3 also shows the graph of FIGS. 1 and 2. In FIG. 3 a temperature dead zone 4 is illustrated. The dead zone 4 is a desired temperature range of the outlet temperature. Itit is desirable to control the vapour compression system, including the rotational speed of the fan, in such a manner that the outlet temperature is within the dead zone 4. Furthermore, this may advantageously be obtained while controlling the rotational speed of the fan to be within the effective range 3 illustrated in FIG. 2.

The dead zone 4 is delimited by a first temperature value 5 and a second temperature value 6. The outlet temperature can be measured, and in response to the measured value, the fan speed can be adjusted in order to obtain temperature values which are within the dead zone 4. However, the graph shown in FIGS. 1-3 is offset when the ambient temperature changes. Therefore, instead of simply measuring the outlet temperature and comparing it to the first temperature value 5 and the second temperature value 6, the ambient temperature is also measured. The temperature difference is calculated, and the temperature difference is compared to a first threshold value, corresponding to the first temperature value 5, and to a second threshold value, corresponding to the second temperature value 6. In response to this comparison the rotational speed of the fan is controlled in the following manner.

If the temperature difference is larger than the first threshold value, corresponding to the outlet temperature being higher than the first temperature value 5, the rotational speed of the fan is increased. This may, e.g., be done by jumping up the rotational speed or by ramping up the rotational speed. This is illustrated by zone 7 in FIG. 3.

If the temperature difference is smaller than the first threshold value, but larger than the second threshold value, corresponding to the outlet temperature being within the dead zone, the rotational speed of the fan is maintained at the current speed. This is illustrated by zone 8 in FIG. 3.

If the temperature difference is smaller than the second threshold value, corresponding to the outlet temperature being lower than the second temperature value 6, the rotational speed of the fan is decreased. This is preferably done by ramping down the speed in order to avoid that zone 7 is entered. This situation is illustrated by zone 9 in FIG. 3.

The dead zone 4 is a range of outlet temperatures where the rotational speed of the fan is kept constant. When the outlet temperature is above the dead zone 4, the rotational speed of the fan is increased, preferably, e.g. jumped up or ramped up at a high rate, and when the outlet temperature is below the dead zone 4, the rotational speed of the fan is decreased, preferably ramped down at a low rate.

Figure 4:
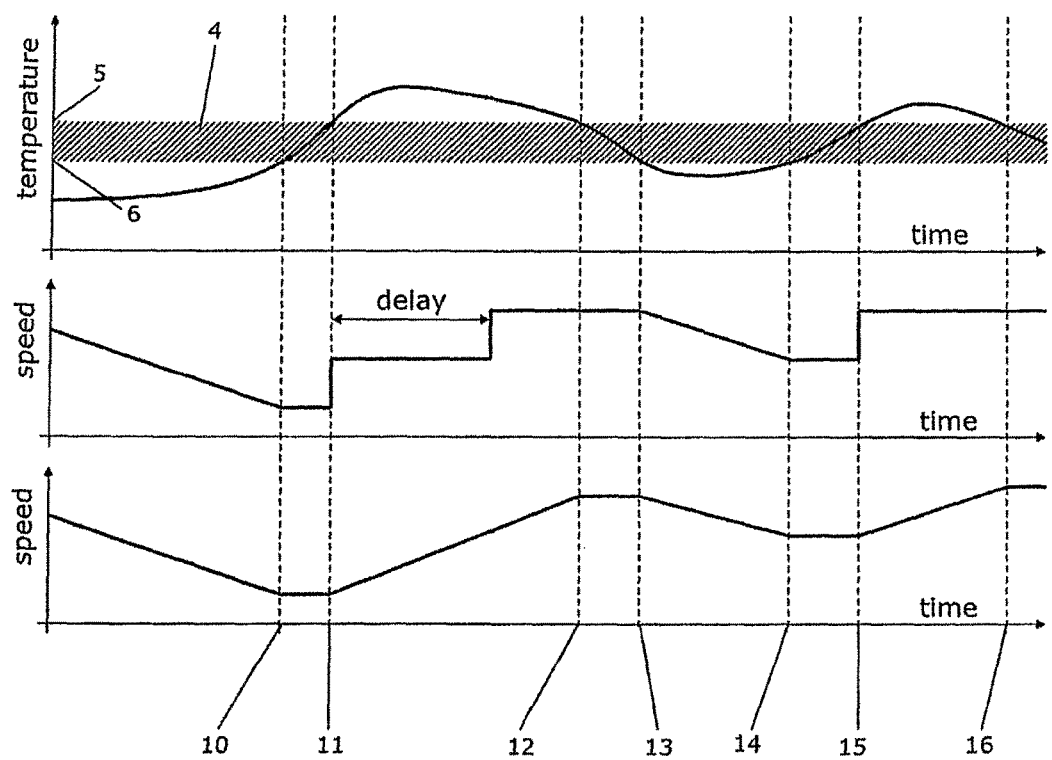
FIG. 4 is a graph illustrating control of rotational speed of a fan according to two different embodiments of the invention.

FIG. 4 is a graph illustrating control of rotational speed of a fan according to two different aspects of control according to the invention, and in accordance with the method described above with reference to FIG. 3.

The top graph shows outlet temperature as a function of time. The dead zone 4, the first temperature value 5 and the second temperature value 6 are shown.

The middle graph and the lower graph show rotational speed of a fan as a function of time, according to two different control methods, and in response to the temperature variations shown in the top graph.

Initially the outlet temperature is below the dead zone 4. Therefore, for the outlet temperature to increase and thereby enter the dead zone 4, the rotational speed of the fan is ramped down, i.e. it is gradually decreased, as in the control aspect illustrated in the middle graph as well as in the control aspect illustrated in the lower graph.

At time 10 the outlet temperature reaches the second temperature value 6, and thereby enters the dead zone 4. In response to this, the rotational fan is maintained at a constant value as in the control aspect illustrated in the middle graph as well as in the control aspect illustrated in the lower graph. However, the outlet temperature continues to increase, and at time 11 the first temperature value 5 is reached, and the outlet temperature increases above the dead zone 4. In response to this, the rotational speed of the fan is increased, for causing the outlet temperature to decrease and once again enter the dead zone 4.

In the control aspect illustrated in the middle graph, the rotational speed of the fan is increased by jumping up the rotational speed, i.e. by abruptly increasing the rotational speed by a significant amount. Subsequently, the rotational speed is maintained at a constant level for a time period ("delay"), in order to allow the system to react to the jump in rotational speed of the fan. When the time period has elapsed, the outlet temperature is established being still above the dead zone 4, and therefore the rotational speed of the fan is jumped up once again.

In the control aspect illustrated in the lower graph, the rotational speed is ramped up, i.e. it is gradually increased.

At time 12 the outlet temperature has decreased and reaches the first temperature value 5, thereby entering the dead zone 4. In response to this, the rotational speed of the fan is maintained constant as in the control aspect illustrated in the middle graph as well as in the control aspect illustrated in the lower graph.

At time 13 the outlet temperature reaches the second temperature value 6, thereby decreasing below the dead zone 4. In response to this, the rotational speed of the fan is ramped down as in the control aspect illustrated in the middle graph as well as in the control aspect illustrated in the lower graph.

At time 14 the outlet temperature once again reaches the second temperature value 6, thereby entering the dead zone 4. In response to this, the rotational speed of the fan is maintained constant as in the control aspect illustrated in the middle graph as well as in the control aspect illustrated in the lower graph.

At time 15 the outlet temperature once again reaches the first temperature value 5, thereby increasing above the dead zone 4, and once again the rotational speed of the fan is increased in response to this. In the control aspect illustrated in the middle graph, the rotational speed of the fan is jumped up, and in the control aspect illustrated in the lower graph, the rotational speed of the fan is ramped up, as described above.

Finally, at time 16 the outlet temperature once again reaches the first temperature value 5, thereby entering the dead zone 4. In response to this, the rotational speed of the fan is once again maintained constant.

In summary, the control aspect method illustrated in the middle graph is an asymmetric control aspect, in the sense that the rotational speed of the fan is increased rapidly and significantly if it is established that the outlet temperature is above the dead zone 4, and the rotational speed of the fan is decreased carefully and gradually if it is established that the outlet temperature is below the dead zone 4. The control aspect illustrated in the lower graph is symmetrical in the sense that the rotational speed of the fan is increased or decreased gradually when the outlet temperature is outside the dead zone 4, regardless of whether the outlet temperature is above or below the dead zone 4.

Figure 5:
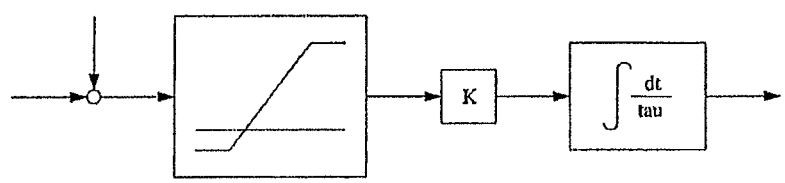
FIGS. 5-7 show three block diagrams, each illustrating an integrating controller for use in a method for controlling rotational speed of a fan.
Figure 6:
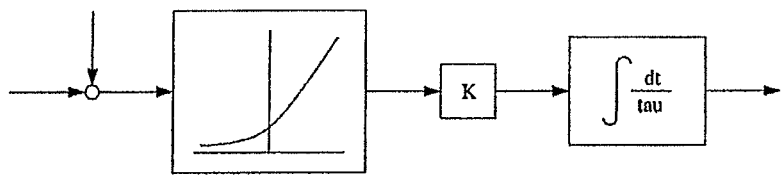
Figure 7:
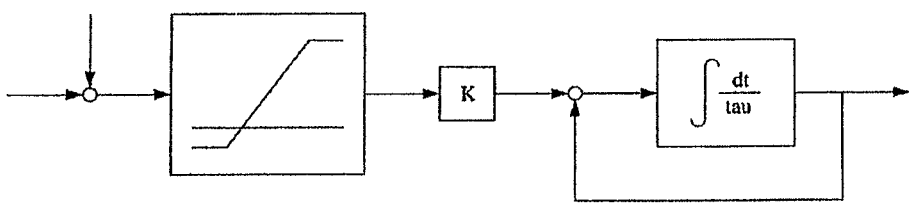

FIGS. 5-7 are three block diagrams, each illustrating a method for controlling a fan according to aspects of control according to the invention. In the control aspect illustrated in FIG. 5, an asymmetric, but substantially linear, function is used for controlling the rotational speed of the fan in response to a measured outlet temperature.

In the control aspect illustrated in FIG. 6, an aggressive scaling function, in the form of an exponential function, is used for determining the rotational speed of the fan in response to a measured outlet temperature.

In the control aspect illustrated in FIG. 7, the function is identical to the function used in the control aspect illustrated in FIG. 5. However, in the control aspect illustrated in FIG. 7, a closed loop feedback is used.

Although various embodiments of the present invention have been described and shown, the invention is not restricted thereto, but may also be embodied in other ways within the scope of the subject-matter defined in the following claims.

What is claimed is:

1. A method of controlling a fan of a vapour compression system, the vapour compression system comprising a compressor, a heat rejecting heat exchanger, an expansion device and an evaporator arranged in a refrigerant circuit, said fan being arranged to provide a fluid flow across the heat rejecting heat exchanger, the method comprising the steps of:
    establishing a temperature, $T_1$, of refrigerant leaving the heat rejecting heat exchanger,
    establishing a temperature, $T_2$, of ambient air of the heat rejecting heat exchanger,
    deriving a temperature difference, $\Delta T = T_1 - T_2$, between the temperature ($T_1$) of refrigerant leaving the heat rejecting heat exchanger and the temperature ($T_2$) of ambient air of the heat rejecting heat exchanger,
    comparing the temperature difference, $\Delta T$, to a first threshold value and to a second threshold value, the second threshold value being smaller than or equal to the first threshold value, and
    controlling the rotational speed of the fan on the basis of the comparing step wherein the step of controlling the rotational speed of the fan comprises the steps of:
    if the temperature difference, $\Delta T$, is larger than the first threshold value, increasing the rotational speed of the fan, and
    if the temperature difference, $\Delta T$, is smaller than the second threshold value, decreasing the rotational speed of the fan,
    wherein increasing the rotational speed of the fan occurs more rapidly than decreasing the rotational speed of the fan.

2. The method according to claim 1, wherein the step of decreasing the rotational speed of the fan includes decreasing the speed by 0.1%-10.0% of the maximum rotational speed of the fan per minute.

3. The method according to claim 1, wherein the step of increasing the rotational speed of the fan includes increasing the rotational speed of the fan by 5%-100% of the maximum rotational speed of the fan.

4. The method according to claim 1, wherein the step of increasing the rotational speed of the fan and/or the step of decreasing the rotational speed of the fan is/are performed using an asymmetric scaling function.

5. The method according to claim 1, wherein the second threshold value is smaller than the first threshold value, the method further comprising the step of:
    if the temperature difference, $\Delta T$, is smaller than the first threshold value and larger than the second threshold value, maintaining the rotational speed of the fan.

6. The method according to claim 1, wherein the first threshold value is equal to the second threshold value.

7. The method according to claim 1, wherein the vapour compression system is operated with a refrigerant being in a supercritical state when flowing in the refrigerant circuit.

8. The method according to claim 1, wherein the refrigerant flowing in the refrigerant circuit is carbon-dioxide ($CO_2$).

9. The method according to claim 2, wherein the step of increasing the rotational speed of the fan and/or the step of decreasing the rotational speed of the fan is/are performed using an asymmetric scaling function.

10. The method according to claim 3, wherein the step of increasing the rotational speed of the fan and/or the step of decreasing the rotational speed of the fan is/are performed using an asymmetric scaling function.

11. The method according to claim 2, wherein the step of increasing the rotational speed of the fan includes increasing the rotational speed of the fan by 5%-100% of the maximum rotational speed of the fan.

12. The method according to claim 2, wherein the second threshold value is smaller than the first threshold value, the method further comprising the step of:
    if the temperature difference $\Delta T$, is smaller than the first threshold value and larger than the second threshold value, maintain the rotational speed of the fan.

13. The method according to claim 2, wherein the first threshold value is equal to the second threshold value.

14. The method according to claim 2, wherein the vapour compression system is operated with a refrigerant being in a super critical state when flowing in the refrigerant circuit.

15. The method according to claim 2, wherein the refrigerant flowing in the refrigerant circuit is carbon dioxide ($CO_2$).

16. A heat rejecting heat exchanger comprising a fan being arranged to provide a fluid flow across the heat rejecting heat exchanger, said fan being capable of being controlled by a method according to claim 2.

17. The method according to claim 3, wherein the second threshold value is smaller than the first threshold value, the method further comprising the step of:

if the temperature difference ΔT, is smaller than the first threshold value and larger than the second threshold value, maintain the rotational speed of the fan.

18. The method according to claim 3, wherein the first threshold value is equal to the second threshold value.

19. A heat rejecting heat exchanger comprising a fan being arranged to provide a fluid flow across the heat rejecting heat exchanger, said fan being configured to operate according to the method of claim 1.

20. A refrigeration system comprising a compressor, a gas cooler, an expansion device and an evaporator arranged in a refrigerant circuit, said gas cooler being a heat rejecting heat exchanger according to claim 19.

* * * * *